US012792443B2

(12) United States Patent
Albero et al.

(10) Patent No.: US 12,792,443 B2
(45) Date of Patent: Nov. 10, 2026

(54) SYSTEMS AND METHODS FOR MIGRATING APPLICATION FUNCTIONALITY USING ADVANCED COMPUTATIONAL MODELS FOR DATA ANALYSIS AND AUTOMATED PROCESSING

(71) Applicant: BANK OF AMERICA CORPORATION, Charlotte, NC (US)

(72) Inventors: George Anthony Albero, Charlotte, NC (US); Naga Vamsi Krishna Akkapeddi, Charlotte, NC (US); Nagasubramanya Lakshminarayana, Concord, NC (US); Durga Prasad Kutthumolu, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 235 days.

(21) Appl. No.: 18/663,436

(22) Filed: May 14, 2024

(65) Prior Publication Data

US 2025/0355747 A1 Nov. 20, 2025

(51) Int. Cl.
*G06F 11/00* (2006.01)
*G06F 11/07* (2006.01)
(Continued)

(52) U.S. Cl.
CPC ........ *G06F 11/0778* (2013.01); *G06F 11/203* (2013.01); *G06F 11/3447* (2013.01); *G06F 2201/805* (2013.01); *G06F 2201/87* (2013.01)

(58) Field of Classification Search
CPC ............... G06F 11/0778; G06F 11/203; G06F 11/3065; G06F 11/3447
See application file for complete search history.

(56) References Cited

U.S. PATENT DOCUMENTS 7,051,288 B2 5/2006 Bennett
7,681,134 B1 3/2010 Grechishkin
(Continued)

FOREIGN PATENT DOCUMENTS

EP 2356563 B1 6/2018
EP 2891038 B1 6/2020

*Primary Examiner* — Elmira Mehrmanesh

(74) *Attorney, Agent, or Firm* — Moore & Van Allen PLLC; William Walters

(57) ABSTRACT

Systems, computer program products, and methods are described herein for migrating application functionality using advanced computational models for data analysis and automated processing. The present disclosure is configured to receive, via a learning agent, a transaction incident associated with a source application in a transaction, wherein the transaction comprises one or more applications, and wherein the learning agent comprises learning the applications' functionality; determine, using a real time incident listener, a scope of the transaction incident; access an application inventory to determine a target application, wherein the application inventory comprises a database of applications, and wherein the database of applications is associated with an entity that is associated with the system; generate, using a script generator, a script, wherein the script comprises a source function associated with the source application; deploy the script to the target application; and monitor the target application with a federated learning module.

17 Claims, 5 Drawing Sheets

(51) Int. Cl.
*G06F 11/20* (2006.01)
*G06F 11/34* (2006.01)

(56) References Cited

U.S. PATENT DOCUMENTS

| | | | | |
|---|---|---|---|---|
| 7,711,712 | B2 * | 5/2010 | Kano | G06F 11/1469 707/672 |
| 7,735,081 | B2 | 6/2010 | Robinson | |
| 7,996,785 | B2 | 8/2011 | Neil | |
| 8,117,554 | B1 | 2/2012 | Grechishkin | |
| 8,209,408 | B1 | 6/2012 | Huang | |
| 8,341,208 | B2 | 12/2012 | Mazzaferri | |
| 8,683,466 | B2 | 3/2014 | Raj Seeniraj | |
| 8,732,287 | B2 | 5/2014 | Lee | |
| 8,910,163 | B1 | 12/2014 | Grechishkin | |
| 8,959,395 | B2 * | 2/2015 | Havemose | G06F 11/141 714/16 |
| 8,972,977 | B2 | 3/2015 | Neil | |
| 9,256,447 | B2 | 2/2016 | Gujarathi | |
| 9,317,195 | B1 | 4/2016 | Grechishkin | |
| 9,471,335 | B2 | 10/2016 | Momchilov | |
| 9,804,872 | B1 | 10/2017 | Ozerov | |
| 11,010,212 | B2 | 5/2021 | Schreiner | |
| 2006/0010422 | A1 | 1/2006 | Reddy | |
| 2006/0277307 | A1 * | 12/2006 | Bernardin | H04L 67/562 709/226 |
| 2015/0212907 | A1 * | 7/2015 | Portier | G06F 11/2007 714/4.11 |
| 2015/0309893 | A1 * | 10/2015 | Southern | G06F 11/203 714/4.11 |
| 2015/0324254 | A1 * | 11/2015 | Prasad | G06F 11/079 707/642 |
| 2016/0044088 | A1 | 2/2016 | Momchilov | |
| 2019/0102265 | A1 * | 4/2019 | Ngo | H04L 67/1034 |
| 2021/0208923 | A1 * | 7/2021 | Hu | G06F 11/004 |
| 2022/0012037 | A1 * | 1/2022 | Palanisamy | G06F 3/0619 |
| 2023/0359473 | A1 * | 11/2023 | Lee | G06F 11/14 |
| 2024/0193029 | A1 * | 6/2024 | Ramanathan | G06F 11/0793 |
| 2024/0248790 | A1 * | 7/2024 | Verma | G06F 11/0712 |

* cited by examiner

SYSTEMS AND METHODS FOR MIGRATING APPLICATION FUNCTIONALITY USING ADVANCED COMPUTATIONAL MODELS FOR DATA ANALYSIS AND AUTOMATED PROCESSING

TECHNOLOGICAL FIELD

Example embodiments of the present disclosure relate to migrating application functionality using advanced computational models for data analysis and automated processing.

BACKGROUND

There are significant challenges associated with maintaining application functionality during a transaction. Applicant has identified a number of deficiencies and problems associated with migrating application functionality using advanced computational models for data analysis and automated processing. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for migrating application functionality using advanced computational models for data analysis and automated processing.

Embodiments of the present invention address the above needs and/or achieve other advantages by providing apparatuses (e.g., a system, computer program product, and/or other devices) and methods for migrating application functionality using advanced computational models for data analysis and automated processing. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention receives, via a learning agent, a transaction incident associated with a source application in a transaction, wherein the transaction includes one or more applications, and wherein the learning agent comprises learning the applications' functionality. In some embodiments, the present invention determines, using a real time incident listener, a scope of the transaction incident. In some embodiments, the present invention accesses an application inventory to determine a target application, wherein the application inventory includes a database of applications, and wherein the database of applications is associated with an entity that is associated with the system. In some embodiments, the present invention generates, using a script generator, a script, wherein the script includes a source function associated with the source application. In some embodiments, the present invention deploys the script to the target application. In some embodiments, the present invention monitors the target application with a federated learning module, wherein the federated learning module identifies issues associated with the target application.

In some embodiments, the real time incident listener further includes collecting incident data associated with the transaction incident, wherein the incident data comprises logs, error messages, and metrics. In some embodiments, the real time incident listener further includes mapping dependencies associated with the source application. In some embodiments, the real time incident listener further includes analyzing an incident impact associated with the transaction incident and the source application.

In some embodiments, determining the target application further includes using the learning agent to determine an application tier level associated with the target application's performance capability. In some embodiments, determining the target application further includes using the learning agent to determine an application authentication level associated with the target application's securitization of data. In some embodiments, determining the target application further includes using the application inventory to determine an application connection method associated with the target application's connection ports.

In some embodiments, the script includes generating instructions that, when executed by the target application, perform functions substantially similar to the source application's functions.

In some embodiments, the script generator includes a knowledge base, wherein the knowledge base includes generating the script in response to troubleshooting, policy updates, and historical performance associated with previously generated scripts.

In some embodiments, the target application includes one or more of the applications associated with the application inventory.

In some embodiments, deploying the script includes transmitting, via the learning agent, data associated with the transaction to the target application for processing.

In some embodiments, each application associated with the transaction includes a learning agent.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany-ing drawings. The components illustrated in the figures may or may not be present in certain embodiments described herein. Some embodiments may include fewer (or more) components than those shown in the figures.

Figure 1A:
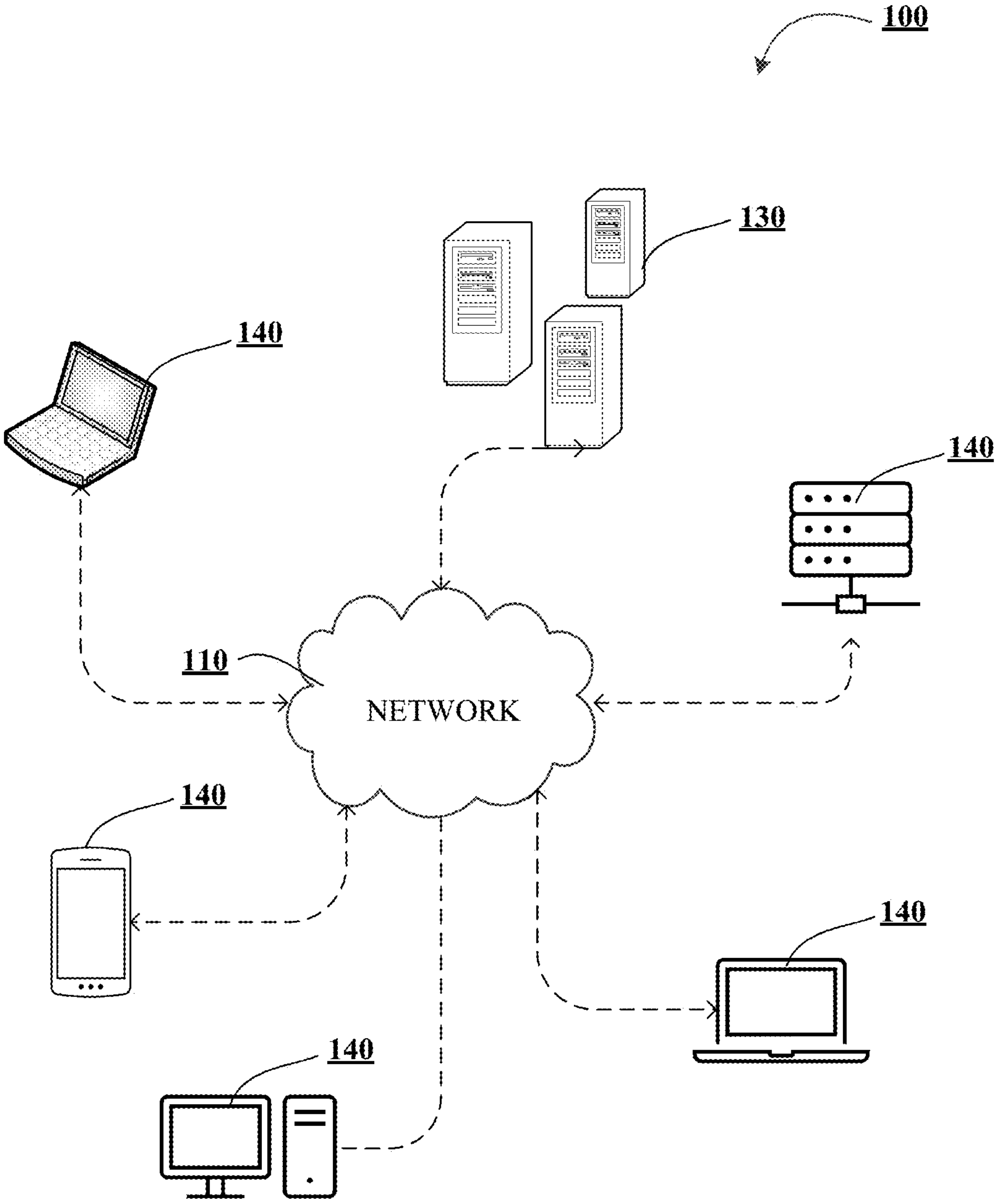
Figure 1B:
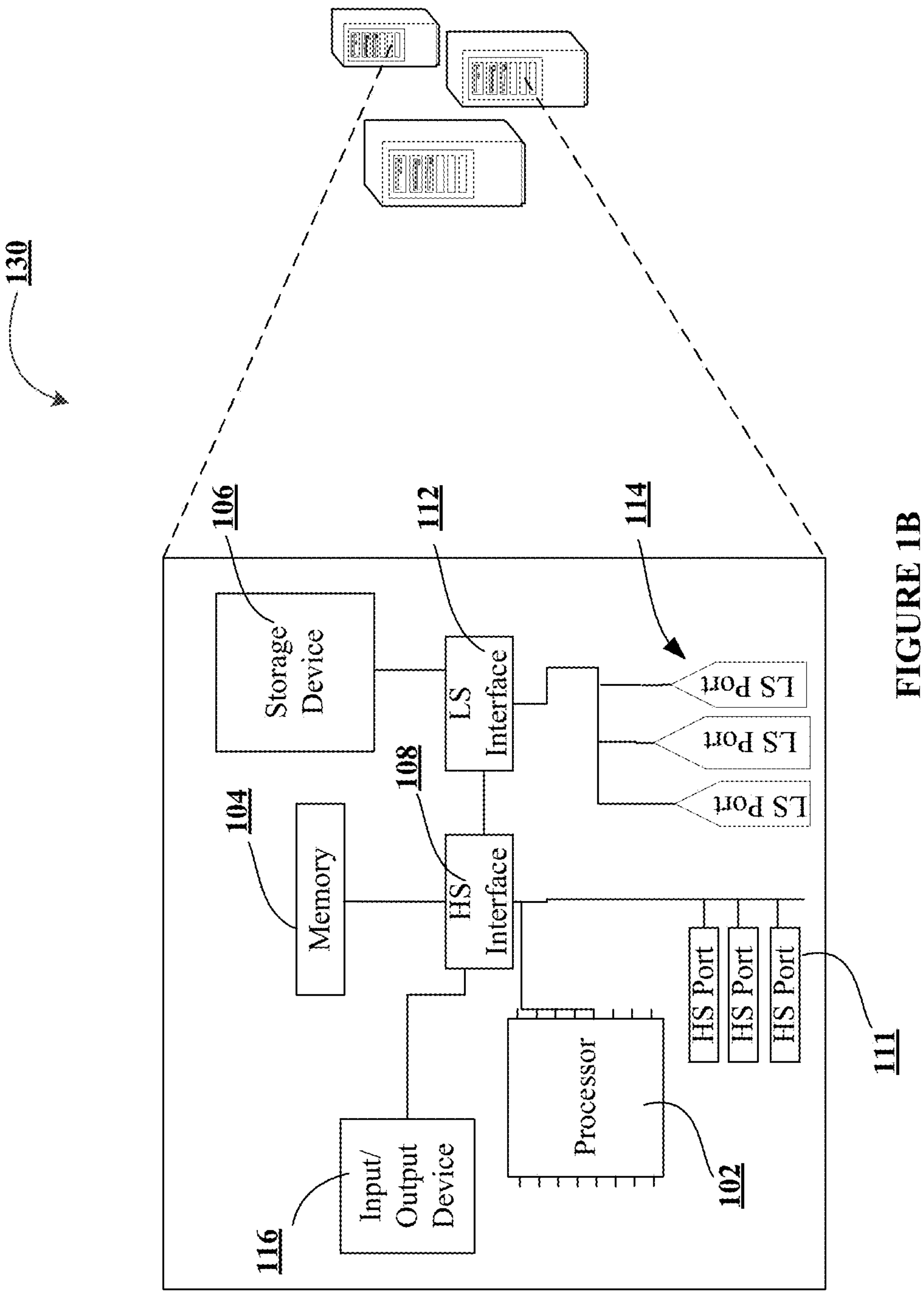
Figure 1C:
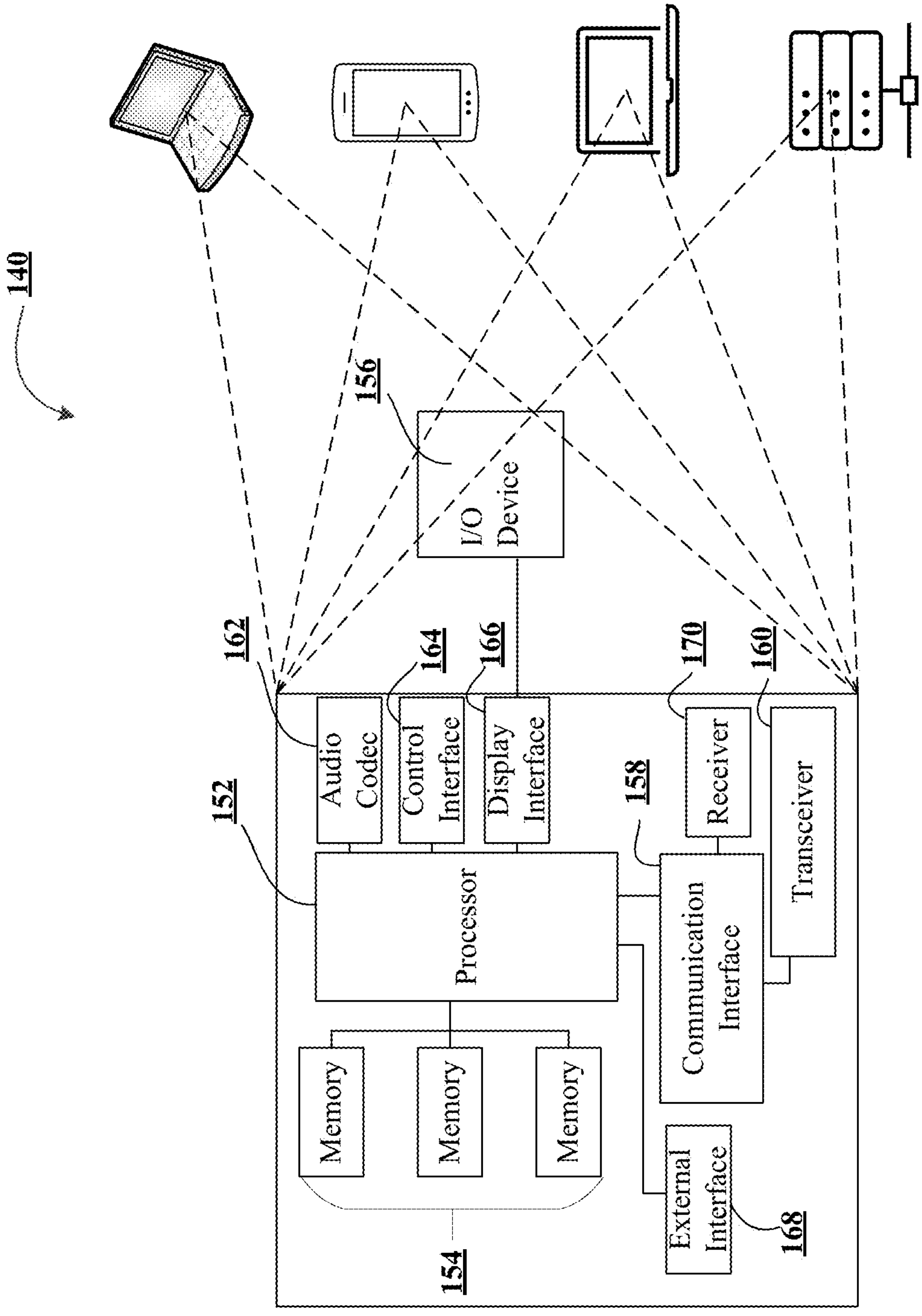
Figure 2:
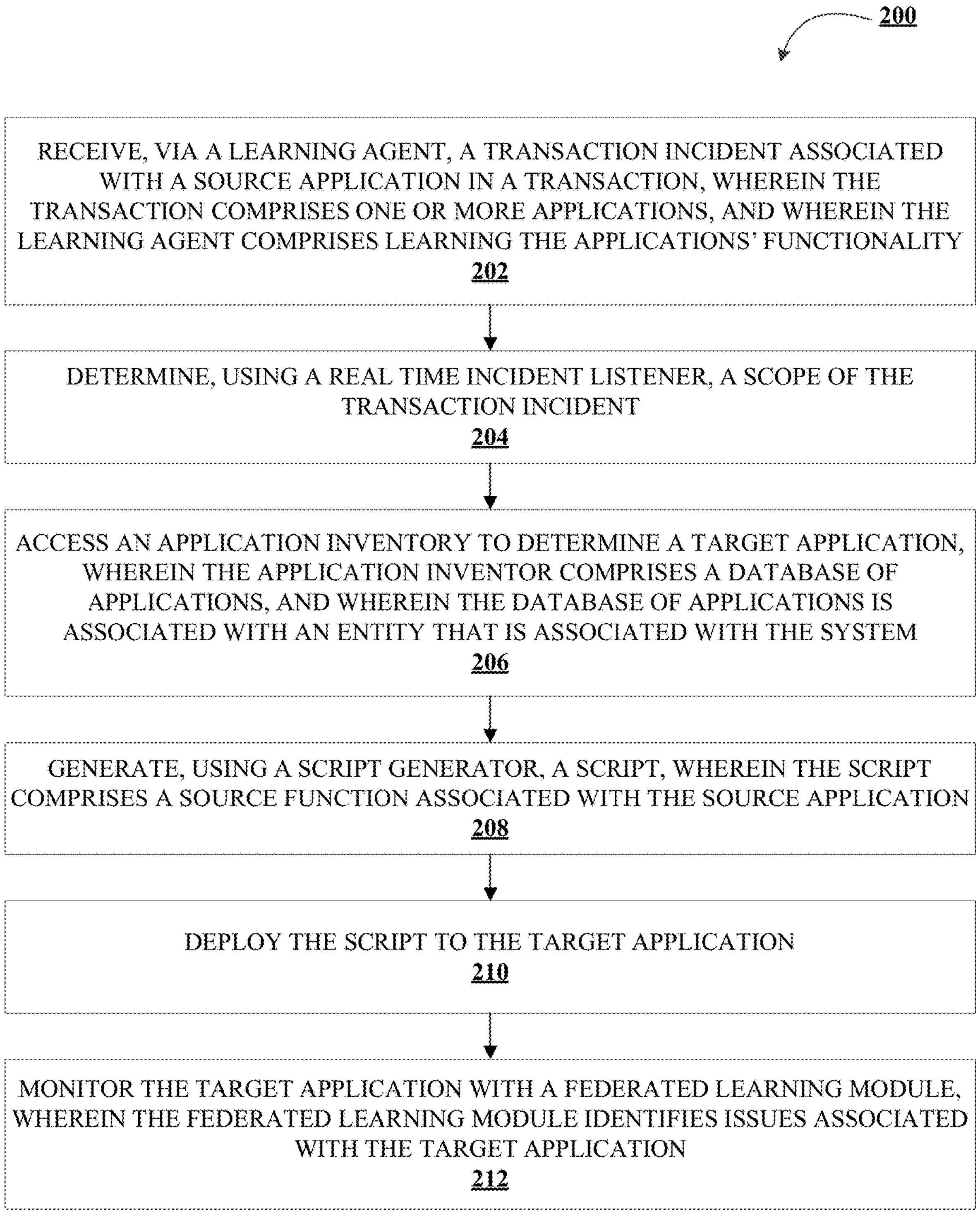
Figure 3:
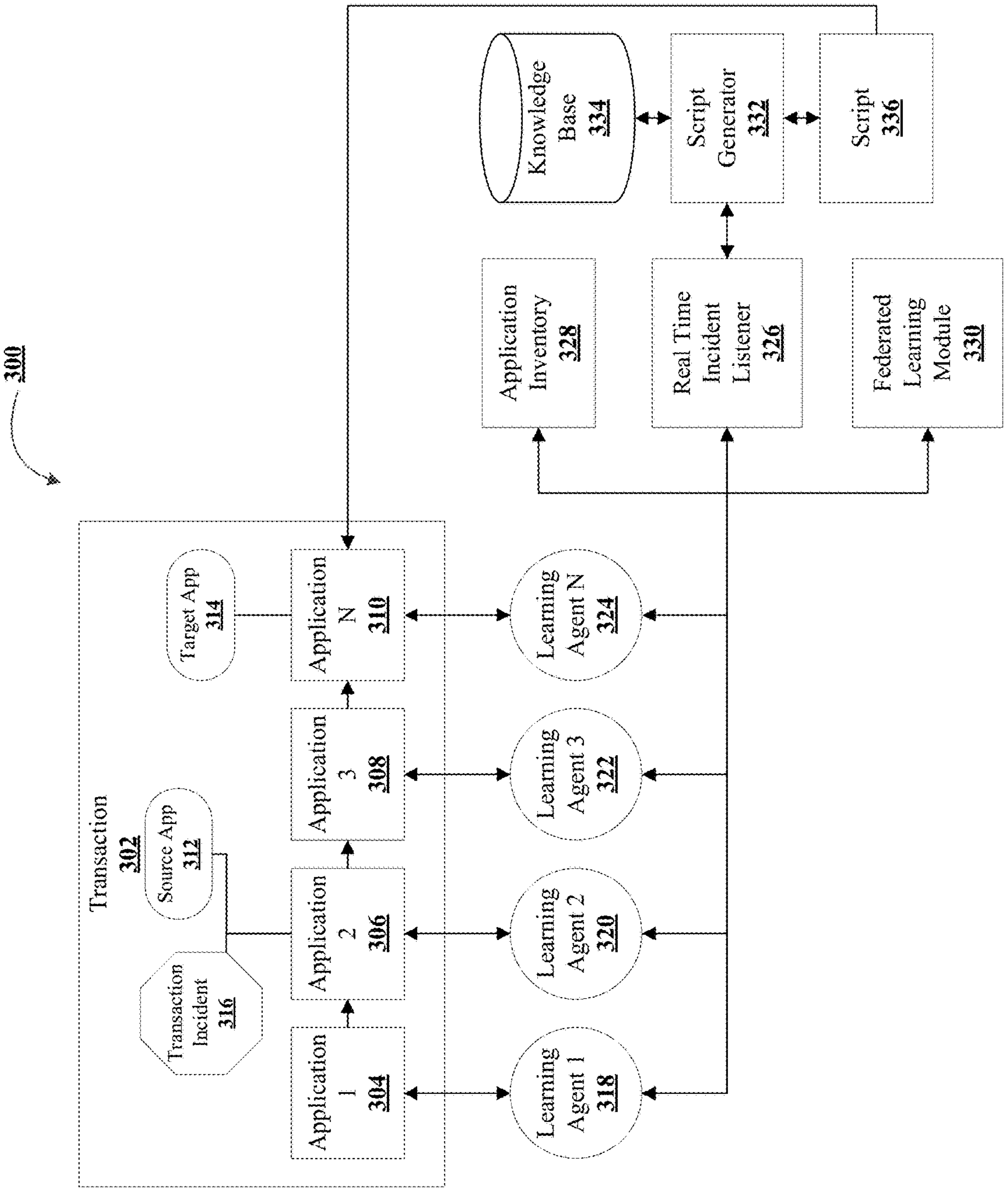

FIGS. 1A-1C illustrates technical components of an exemplary distributed computing environment for migrating application functionality using advanced computational models for data analysis and automated processing, in accordance with an embodiment of the disclosure;

FIG. 2 illustrates a process flow for migrating application functionality using advanced computational models for data analysis and automated processing, in accordance with an embodiment of the disclosure; and FIG. 3 illustrates an example embodiment of the application migration system, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a “user interface” may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an “engine” may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, “authentication credentials” may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that “operatively coupled,” as used herein, means that the components may be formed integrally with each other, or may be formed separately and coupled together. Furthermore, “operatively coupled” means that the components may be formed directly to each other, or to each other with one or more components located between the components that are operatively coupled together. Furthermore, “operatively coupled” may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "transfer," a "distribution," and/or an "allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

In modern computing, a transaction may include using multiple applications depending on the transaction request. As technology develops, these applications may become specific in their functionality and may take on roles that are crucial for completing the transaction at hand. In this way, the specific and focused functionality of advanced applications, while being efficient and effective in their processes, may cause issues within a transaction if an application no longer functions as intended. For instance, an application that provides a critical functionality within a transaction may disrupt the entire transaction if the application is no longer functional. Conventional systems and their technicians may plan around scheduled down times of applications, however many times the down time may be unscheduled and caused by errors (e.g., memory issues, connectivity issues, etc.). Therefore, a system that migrates application functionality to other applications is provided herein.

The application migration system as described herein may learn, through learning agents, the applications' functionalities within a particular transaction. The learning agents may be operatively coupled with each application within a transaction. The application migration system may also include a real time incident listener. The real time incident listener may monitor the applications in a transaction and determine when an application encounters a transaction incident that causes down time for the application. The application that encounters the transaction incident may be designated as a source application, and the source application's functionality may be transferred to a target application capable of performing the source application's functions. An application inventory may be used to search for a suitable target application. Once the target application is found, a script generator may generate a script for the target application that includes the source application's functionality. Further, a federated learning module may be used to monitor the applications (including the target application) to ensure the applications are performing as expected.

What is more, the present disclosure provides a technical solution to a technical problem. As described herein, the technical problem includes issues associated with an application (e.g., a source application) encountering unscheduled down time within a transaction. The technical solution presented herein allows for migrating the source application's functionality to a target application. In particular, application migration system is an improvement over existing solutions to conventional systems that rely on scheduling down time of the source application, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

In addition, the technical solution described herein is an improvement to computer technology and is directed to non-abstract improvements to the functionality of a computer platform itself. Specifically, the application migration system as described herein is a solution to the problem of encountering unscheduled or unanticipated down time of an application, which may affect the completion of a transaction. Further, the application migration system may be characterized as identifying a specific improvement in computer capabilities and/or network functionalities in response to the application migration system's integration to existing devices, software, applications, and/or the like. In this way, the application migration system improves the capability of a system by migrating a source application's functionality to a target application in order to complete a transaction. Further, the application migration system improves the functionality of networks in response to reducing the resources consumed by the system (e.g., network resources, computing resources, memory resources, and/or the like).

FIGS. 1A-1C illustrate technical components of an exemplary distributed computing environment 100 for migrating application functionality using advanced computational models for data analysis and automated processing, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates a process flow for migrating application functionality using advanced computational models for data analysis and automated processing, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, an application migration system (e.g., similar to one or more of the systems described herein with respect to FIGS. 1A-1C) may perform one or more of the steps of process flow 200. For example, an application migration system (e.g., the system 130 described herein with respect to FIGS. 1A-1C) may perform the steps of process flow 200.

As shown in block 202, the process flow 200 of this embodiment includes receiving, via a learning agent, a transaction incident associated with a source application in a transaction, wherein the transaction comprises one or more applications, and wherein the learning agent comprises learning the applications' functionality. In some embodiments, the learning agent may include a separate application communicatively coupled to the applications in the transaction. For example, as shown in FIG. 3, the application 1 304 may have a learning agent 1 318 communicatively coupled to it. The learning agent may continuously learn the application's functionality, capability, operations, dependencies, and the like. The learning agent may further be communicatively coupled to the application inventory, real time incident listener, federated learning module, and the like, as discussed below. In some embodiments, the learning agent may be decentralized and use the federated learning module (as discussed below) across different applications and/or environments. In this way, the learning agent may learn from its experiences by monitoring real time incidents without exchanging sensitive information.

In some embodiments, each application may have a dedicated learning agent communicatively coupled to the application. For instance, as shown in FIG. 3, the application 1 304 may be communicatively coupled to the learning agent 1 318, the application 2 306 may be communicatively coupled to the learning agent 2 320, and so on. Further, the transaction 302 may include any number of applications, with application N 310 representing the final application associated with the transaction 302. In some embodiments, the applications (e.g., the application 1 304, the application 2 306, the application 3 308, the application N 310) may all be communicatively coupled to the same learning agent.

In some embodiments, the transaction incident may be a scheduled or an unscheduled transaction incident. The schedule transaction incidents may include scheduled down time of the application for maintenance, update, repair, versioning, replacement, retirement, or the like of the application. The unscheduled transaction incidents may include unexpected down time of the application which may result from issues, errors, security breaches, incompatibility, unscheduled maintenance, or the like. For instance, as shown in FIG. 3, the transaction incident 316 may affect an application (e.g., application 2 306) in the transaction 302. In this way, the transaction incident 316 may affect application 2 306 in such a way that disables the functionality of application 2 306. In other words, the transaction incident 316 may limit, reduce, or eliminate application 2's 306 ability to continue with the transaction 302.

In some embodiments, the source application may be the application that experiences a transaction incident. For example, as shown in FIG. 3, the application 2 306 may experience the transaction incident 316 and may subsequently be designated as the source application 312. The application migration system may then, through the learning agent (learning agent 2 320 in FIG. 3), learn the source application's 312 (application 2 306) functionality, as discussed below.

As shown in block 204, the process flow 200 of this embodiment includes determining, using a real time incident listener, a scope of the transaction incident. The real time incident listener may be communicatively coupled to the application in the transaction or may be communicatively coupled to the learning agent coupled to the application in the transaction. For instance, as shown in FIG. 3, the real time incident listener 326 may be communicatively coupled to, for example, learning agent 2 320. In this way, the learning agent 2 320 may update the real time incident listener 326 of the transaction incident 316 transpiring during transaction 302.

In some embodiments, the real time incident listener further includes collecting incident data associated with the transaction incident, wherein the incident data includes logs, error messages, and metrics. The incident data may determine how widespread the incident is by indicating which components have been affected by the transaction incident. In this way, the logs may include detailed reporting of events, operations, and actions taken surrounding the transaction incident. Further, the logs may provide timestamps, transaction details, system activity, forensic analysis, performance metrics, or the like relating to the transaction incident. Similarly, the error messages and metrics may provide useful information relating to the transaction incident that includes diagnostic information and types of performance issues triggered by the transaction incident.

In some embodiments, the real time incident listener includes mapping dependencies associated with the source application. Mapping dependencies associated with the source application may include determining other components that send data to or receive data from the source application. For example, as shown in FIG. 3, the source application 312 (e.g., application 2 306) may receive data from the application 1 304 and transmit data to the application 3 308.

In some embodiments, the real time incident listener includes analyzing an incident impact associated with the transaction incident and the source application. In this way, the scope of the transaction may indicate how much the transaction incident has affected the transaction.

For example, as shown in FIG. 3, the real time incident listener 326 may collect data associated with the transaction incident 316 impacting application 2 306. The data collected may relate to the transaction incident 316, which may include what type of incident is occurring, expected down time of application 2 306, potential solutions to cure the incident, or any other effects associated with the transaction incident 316. Further, the data collected may related to application 2 306 such as its dependencies (e.g., application 1 304 and application 3 308), the functions application 2 performs in the transaction 302, the type of information passing through application 2 306, and so on. In this way, and as shown in FIG. 3, the real time incident listener 326 may gather information to understand the functionalities associated with application 2 306, how the transaction incident 316 is affecting the application 2 306 and the transaction 302, as well as how application 2 306 functions within the transaction 302.

As shown in block 206, the process flow 200 of this embodiment includes accessing an application inventory to determine a target application, wherein the application inventory comprises a database of applications, and wherein the database of applications is associated with an entity that is associated with the system. In some embodiments, the application inventory may store the applications associated with the transaction. For example, as shown in FIG. 3, the application inventory 328 may store applications (e.g., application 1 304, application 2 306, application 3 308, and application N 310) associated with the transaction 302. In some embodiments, the applications in the application inventory may be associated with the entity that houses the application migration system and may be applications not associated with the transaction. For example, with reference to FIG. 3, the application inventory 328 may store applications not associated with the transaction 302 (not shown). In other words, if the entity that houses (e.g., manages) the application migration system has one or more additional applications outside of the transaction, those applications may be stored in the application inventory 328.

In some embodiments, determining the target application further includes using the learning agent to determine an application tier level associated with the target application's performance capability. The application tier level may include specifications of the application such as its memory, storage capacity, performance characteristics, bandwidth capacity, connectivity specifications, and the like. In this way, the application tier level may include how efficient and effective the application is at performing a function. In some embodiments, the learning agent may determine the application's performance capability by analyzing historical and real-time performance of the application. In some embodiments, the learning agent may send the application a test sequence, wherein the test sequence is an executable code that provides the learning agent with the application's performance capability when the application executes the test sequence, in order to determine the application's tier level.

In some embodiments, determining the target application further includes using the learning agent to determine an application authentication level associated with the target application's securitization of data. The application authentication level may indicate how the application handles securing data associated with the transaction.

In some embodiments, determining the target application further includes using the application inventory to determine an application connection method associated with the target application's connection ports. The application inventory may include a list of connection methods associated with each application. In some embodiments, the learning agent may determine the application connection method.

In some embodiments, the target application includes one or more of the applications associated with the application inventory. In some embodiments, the target application may include an application that has minimum requirements for performing the source application's functions in the transaction. For example, as shown in FIG. 3, the application 2 306 may be designated as the source application 312 while the application N 310 may be designated as the target application 314. In this example, the application N 310 may meet the minimum requirements for performing the functions associated with application 2 306. In some embodiments, the minimum requirements may not necessarily mean that application N 310 has at least the same application tier level, authentication level, or connection method as application 2 306, rather that application N 310 may meet requirements for performing the functions that application 2 306 performs.

As shown in block 208, the process flow 200 of this embodiment includes generating, using a script generator, a script, wherein the script comprises a source function associated with the source application. The source function may include the functionality of the source application. The source function may include functionalities of the source application and may include specific capabilities which are fundamentally enabled by the broader functionalities of the source application. In other words, the source function may be one or more or all of the functionalities of the source application. For example, and as shown in FIG. 3, the transaction incident 316 may cause the source application 312 to experience a degradation in one of its tangential processes. In this example, the source function may include only the tangential process affected by the transaction incident 316. In another example, if the transaction incident 316 is more widespread and impedes a fundamental process of the source application 312, the source function may include the fundamental process of the source application 312.

Further, the source function may include variations of the source application's native language (e.g., code language) into a different language. In other words, the script may be written in a code language different from the source application. For example, as shown in FIG. 3, if the source application 312 is written in a code language such as C, and the target application 314 language is in Java, the script may be written in Java so it can be executed by the target application 314.

In some embodiments, the script generator may, in real time, generate the scripts used to implement source functions in target applications. In some embodiments, the script generator may already have the scripts generated and stored based on prior collection of the application's functionality. The script generator may generate scripts based on the functionalities of the source application. In some embodiments, and depending on the scope of the transaction incident, the script generator may generate a script that fully replicates the functionality of the source application. For example, and as shown in FIG. 3, the script generator 332 may generate the script 336 based on the source application 312 (e.g., application 2 306), the learning agent (e.g., learning agent 2 320), the real time incident listener 326, and the application inventor 328. In this example, the script 336 may include the functionalities of the source application 312, the scope of the transaction incident 316, and also coding languages and connection methods based on which potential target applications are available in the application inventory 328.

In some embodiments, the script generator may generate a script based on the learning agent communicatively coupled to the target application. In this way, the learning agent and script generator may generate scripts for automatic actions such as restarting environments, rolling back deployments, and deployment to target applications that may be sophisticated and less dependent on predefined scripts.

In some embodiments, the script includes generating instructions that, when executed by the target application, perform functions substantially similar to the source application's functions. In this way, the script may include functionalities of the source application even though the script may be written in a different code language. Further, the target application using the script to perform functions substantially similar to the source application may include, but is not limited to, identical functions of the source application. In this way, the script may, when executed by the target application, perform functions that are either the same or substantially similar to the source application's functions. For example, with reference to FIG. 3, if the source application 312 has code in a first language and the target application 314 has code in a second language, the script 336 may be written in the second language. In this example, the script 336 may, when executed by the target application 314, perform functions substantially similar to the functions of the source application 312.

In some embodiments, the script generator includes a knowledge base, wherein the knowledge base includes generating the script in response to troubleshooting, policy updates, and historical performance associated with previously generated scripts. The knowledge base may continuously update with databases and resources both internal and external to the application migration system. For example, if a policy regulating the processes used to handle user data is stored in the knowledge base, the knowledge base may update the application migration system as the policy is changed. Further, the script generator may continuously update applications associated with the application migration system based on updates to the knowledge base, whether or not there are any transaction incidents that have occurred. In this way, the script generator may generate a script based on the knowledge base update and implement the script to the applications that become out of date.

As shown in block 210, the process flow 200 of this embodiment includes deploying the script to the target application. In some embodiments, deploying the script includes transmitting, via the learning agent, data associated with the transaction to the target application for processing. In some embodiments, the learning agent may route or reroute the data transmitted to the source application to the target application. In this way, the data that was meant for the source application may be rerouted through the learning agent to the target application. For example, in some embodiments and as shown in FIG. 3, data sent to the source application 312 may be routed through the learning agent 2 320 and the learning agent N 324 to the target application 314. In some embodiments, the data sent to the source application 312 may be routed through one learning agent (e.g., learning agent 2 320) and then to the target application 314.

As shown in block 212, the process flow 200 of this embodiment includes monitoring the target application with a federated learning module, wherein the federated learning module identifies issues associated with the target application. The federated learning module may continuously and in real time monitor the status of the application migration system. The federated learning module may communicate with any of the components associated with the application migration system to determine the overall status and health of the system. In some embodiments, the federated learning module may interact with the learning agents to track unsuccessful executions with reference to application interactions. Further, the federated learning module may assist in identifying target applications that are successful in their operations. In an instance where an application is not working as expected, the federated learning module may work with the learning agents to identify the correct target application where services and/or code needs to be deployed. In this way, the federated learning module may choose a new target application better suited for migrating the source application's functionality.

In some embodiments, the federated learning module may use local data of the learning modules and/or applications without exchanging the data, thus preserving data privacy and security. The federated learning module may aggregate the local data to create a comprehensive global model to determine the overall status of the application migration system. In this way, the federated learning module may detect anomalies, issues with applications, inefficiencies, ineffectiveness, or the like.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for migrating application functionality using advanced computational models for data analysis and automated processing, the system comprising:

a processing device;

a non-transitory storage device containing instructions when executed by the processing device, causes the processing device to perform the steps of:

receive, via a learning agent, a transaction incident associated with a source application in a transaction, wherein the transaction comprises one or more applications, and wherein the learning agent comprises learning the applications' functionality;

determine, using a real time incident listener, a scope of the transaction incident, wherein the real time incident listener further comprises:

collecting incident data associated with the transaction incident, wherein the incident data comprises logs, error messages, and metrics;

mapping dependencies associated with the source application; and analyzing an incident impact associated with the transaction incident and the source application;

access an application inventory to determine a target application, wherein the application inventory comprises a database of applications, and wherein the database of applications is associated with an entity that is associated with the system;

generate, using a script generator, a script, wherein the script comprises a source function associated with the source application;

deploy the script to the target application; and monitor the target application with a federated learning module, wherein the federated learning module identifies issues associated with the target application.

2. The system of claim 1, wherein determining the target application further comprises:

using the learning agent to determine an application tier level associated with the target application's performance capability;

using the learning agent to determine an application authentication level associated with the target application's securitization of data; and using the application inventory to determine an application connection method associated with the target application's connection ports.

3. The system of claim 1, wherein the script comprises generating instructions that, when executed by the target application, perform functions substantially similar to the source application's functions.

4. The system of claim 1, wherein the script generator comprises a knowledge base, wherein the knowledge base comprises generating the script in response to troubleshooting, policy updates, and historical performance associated with previously generated scripts.

5. The system of claim 1, wherein the target application comprises one or more of the applications associated with the application inventory.

6. The system of claim 1, wherein deploying the script comprises transmitting, via the learning agent, data associated with the transaction to the target application for processing.

7. The system of claim 1, wherein each application associated with the transaction comprises a learning agent.

8. A computer program product for migrating application functionality using advanced computational models for data analysis and automated processing, the computer program product comprising a non-transitory computer-readable storage medium comprising code causing an apparatus to:

receive, via a learning agent, a transaction incident associated with a source application in a transaction, wherein the transaction comprises one or more applications, and wherein the learning agent comprises learning the applications' functionality;

determine, using a real time incident listener, a scope of the transaction incident, wherein the real time incident listener further comprises:

collecting incident data associated with the transaction incident, wherein the incident data comprises logs, error messages, and metrics;

mapping dependencies associated with the source application; and analyzing an incident impact associated with the transaction incident and the source application;

access an application inventory to determine a target application, wherein the application inventory comprises a database of applications, and wherein the database of applications is associated with an entity that is associated with the system;

generate, using a script generator, a script, wherein the script comprises a source function associated with the source application;

deploy the script to the target application; and monitor the target application with a federated learning module, wherein the federated learning module identifies issues associated with the target application.

9. The computer program product of claim 8, wherein determining the target application further comprises:

using the learning agent to determine an application tier level associated with the target application's performance capability;

using the learning agent to determine an application authentication level associated with the target application's securitization of data; and using the application inventory to determine an application connection method associated with the target application's connection ports.

10. The computer program product of claim 8, wherein the script comprises generating instructions that, when executed by the target application, perform functions substantially similar to the source application's functions.

11. The computer program product of claim 8, wherein the script generator comprises a knowledge base, wherein the knowledge base comprises generating the script in response to troubleshooting, policy updates, and historical performance associated with previously generated scripts.

12. The computer program product of claim 8, wherein the target application comprises one or more of the applications associated with the application inventory.

13. The computer program product of claim 8, wherein deploying the script comprises transmitting, via the learning agent, data associated with the transaction to the target application for processing.

14. The computer program product of claim 8, wherein each application associated with the transaction comprises a learning agent.

15. A method for migrating application functionality using advanced computational models for data analysis and automated processing, the method comprising:

receiving, via a learning agent, a transaction incident associated with a source application in a transaction, wherein the transaction comprises one or more applications, and wherein the learning agent comprises learning the applications' functionality;

determining, using a real time incident listener, a scope of the transaction incident, wherein the real time incident listener further comprises:

collecting incident data associated with the transaction incident, wherein the incident data comprises logs, error messages, and metrics;

mapping dependencies associated with the source application; and analyzing an incident impact associated with the transaction incident and the source application;

accessing an application inventory to determine a target application, wherein the application inventory comprises a database of applications, and wherein the database of applications is associated with an entity that is associated with the system;

generating, using a script generator, a script, wherein the script comprises a source function associated with the source application;

deploying the script to the target application; and monitoring the target application with a federated learning module, wherein the federated learning module identifies issues associated with the target application.

16. The method of claim 15, wherein determining the target application further comprises:

using the learning agent to determine an application tier level associated with the target application's performance capability;

using the learning agent to determine an application authentication level associated with the target application's securitization of data; and using the application inventory to determine an application connection method associated with the target application's connection ports.

17. The method of claim 15, wherein the script comprises generating instructions that, when executed by the target application, perform functions substantially similar to the source application's functions.

* * * * *